United States Patent
Kobayashi

(10) Patent No.: US 10,482,580 B2
(45) Date of Patent: Nov. 19, 2019

(54) IMAGE PROCESSING APPARATUS, IMAGE PROCESSING METHOD, AND PROGRAM

(71) Applicant: CANON KABUSHIKI KAISHA, Tokyo (JP)

(72) Inventor: Satoru Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 10 days.

(21) Appl. No.: 15/705,463

(22) Filed: Sep. 15, 2017

(65) Prior Publication Data

US 2018/0096464 A1   Apr. 5, 2018

(30) Foreign Application Priority Data

Oct. 5, 2016   (JP) .................. 2016-197123

(51) Int. Cl.
| | |
|---|---|
| G06T 5/00 | (2006.01) |
| G06T 3/00 | (2006.01) |
| G06T 5/50 | (2006.01) |
| H04N 5/44 | (2011.01) |
| H04N 5/14 | (2006.01) |

(52) U.S. Cl.
CPC .......... G06T 5/002 (2013.01); G06T 3/0093 (2013.01); G06T 5/50 (2013.01); H04N 5/145 (2013.01); H04N 5/4448 (2013.01); *G06T 2207/10016* (2013.01); *G06T 2207/20201* (2013.01); *G06T 2207/20221* (2013.01)

(58) Field of Classification Search
CPC ......... G06T 5/002; G06T 3/0093; G06T 5/50; H04N 5/4448

USPC ........... 348/474, 231, 9; 382/233, 236, 275; 345/619
See application file for complete search history.

(56) References Cited

U.S. PATENT DOCUMENTS

| | | | | |
|---|---|---|---|---|
| 2007/0133684 A1* | 6/2007 | Ikegami | ................. | H04N 5/145 375/240.16 |
| 2008/0129862 A1* | 6/2008 | Hamada | ................. | H04N 5/145 348/441 |
| 2008/0284768 A1* | 11/2008 | Yoshida | ............... | G09G 3/2022 345/208 |
| 2011/0249750 A1* | 10/2011 | Fuchikami | ........... | H04N 7/0127 375/240.16 |
| 2012/0038793 A1* | 2/2012 | Shimizu | ................. | H04N 5/145 348/231.99 |

(Continued)

FOREIGN PATENT DOCUMENTS

| | | |
|---|---|---|
| JP | 2007-074590 A | 3/2007 |
| JP | 2009-239726 A | 10/2009 |

*Primary Examiner* — Jefferey F Harold
*Assistant Examiner* — Omer Khalid
(74) *Attorney, Agent, or Firm* — Cowan, Liebowitz & Latman, P.C.

(57) ABSTRACT

It is a subject to enable a moving image whose motion is smooth to be generated from a moving image of photographed frames. A motion vector calculating unit calculates a motion vector between the frame images of the moving image. An interpolation frame image generating unit generates an interpolation frame image corresponding to a time position between the frame images on the basis of the motion vector. A motion vector reliability calculating unit, a synthesizing ratio calculating unit, and an image synthesizing unit add a motion blur to the frame image by using the frame image and the interpolation frame image.

13 Claims, 11 Drawing Sheets

(56) References Cited

U.S. PATENT DOCUMENTS

2014/0205193 A1* 7/2014 Umezu ............... H04N 5/2355
                                                    382/169
2015/0071605 A1* 3/2015 Ogawa ................ G11B 27/005
                                                    386/241

* cited by examiner

IMAGE PROCESSING APPARATUS, IMAGE PROCESSING METHOD, AND PROGRAM

BACKGROUND OF THE INVENTION

Field of the Invention

The present invention relates to an image processing apparatus, an image processing method, and a program for processing a moving image.

Description of the Related Art

Among imaging apparatuses such as video camera, still camera, and the like, there is an apparatus of a type having such a function that one frame of a photographed moving image is cut out and is recorded as a still image or the like. By using such a function, the user can relatively easily acquire a still image at decisive moment such as "moment at which a bird is making to fly away". Among displaying apparatuses such as television, display, and the like, there is an apparatus of a type having such a function that an interpolation frame is generated and inserted between frames of the photographed moving image, thereby displaying the moving image at a high-speed frame rate. By using such a function, even in the case of an object whose moving speed is high, it can be displayed as a smooth motion in which an afterimage is suppressed. As another technique, such a technique that by generating an interpolation frame on the basis of a motion vector and a motion vector reliability, a moving image of a high-speed frame rate is generated has been disclosed in Japanese Patent Application Laid-Open Nos. 2007-74590 and 2009-239726.

SUMMARY OF THE INVENTION

In order to photograph an image at decisive moment such as "moment at which a bird is making to fly away" as a moving image and cut out a still image without motion blur from such a moving image, it is necessary to photograph a moving image in which an exposure time of each frame is short. However, although a still image whose motion blur is small can be cut out from the moving image in which the exposure time of each frame is short, when the image is monitored as a moving image, it often becomes an unnatural moving image whose motion is rough.

For example, in the case of a moving image in which a frame rate is equal to 60 frames/sec (time interval between the frames is equal to $1/60$) and an exposure time of each frame is equal to $1/1000$, a time in which the exposure is not performed occurs between the frames. The non-exposure time in which the exposure is not performed is equal to $1/60 - 1/1000 = 47/3000$ second. As mentioned above, according to the moving image in which the exposure time of each frame is very shorter than the time interval between the frames, the long non-exposure time occurs between the frames, a motion blur of each frame is not coupled, and it becomes an unnatural moving image in which a motion of the object is rough.

It is, therefore, an aspect of the present invention to enable a moving image whose motion is smooth to be generated from a moving image of captured frames.

According to an aspect of the present invention, an image processing apparatus comprises: a calculating unit configured to calculate a motion vector between frame images of a moving image; an interpolating unit configured to generate an interpolation frame image corresponding to a time position between frame images which are adjacent with respect to time on the basis of the motion vector; and a generating unit configured to generate a frame image with motion blur acquired by adding a motion blur to the frame image by using the frame image and the interpolation frame image.

According to the invention, the moving image whose motion is smooth can be generated from the moving image of the captured frames.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

An image processing apparatus of the embodiment can be applied to a digital camera, a digital video camera, various kinds of personal digital assistants such as smart phone, tablet terminal, and the like having a camera function, a camera for industrial use, an onboard camera, a camera for medical use, and the like. In the embodiment, a case where an imaging apparatus such as a digital camera or the like is used as an example of application of an image processing apparatus will now be described.

Figure 1:
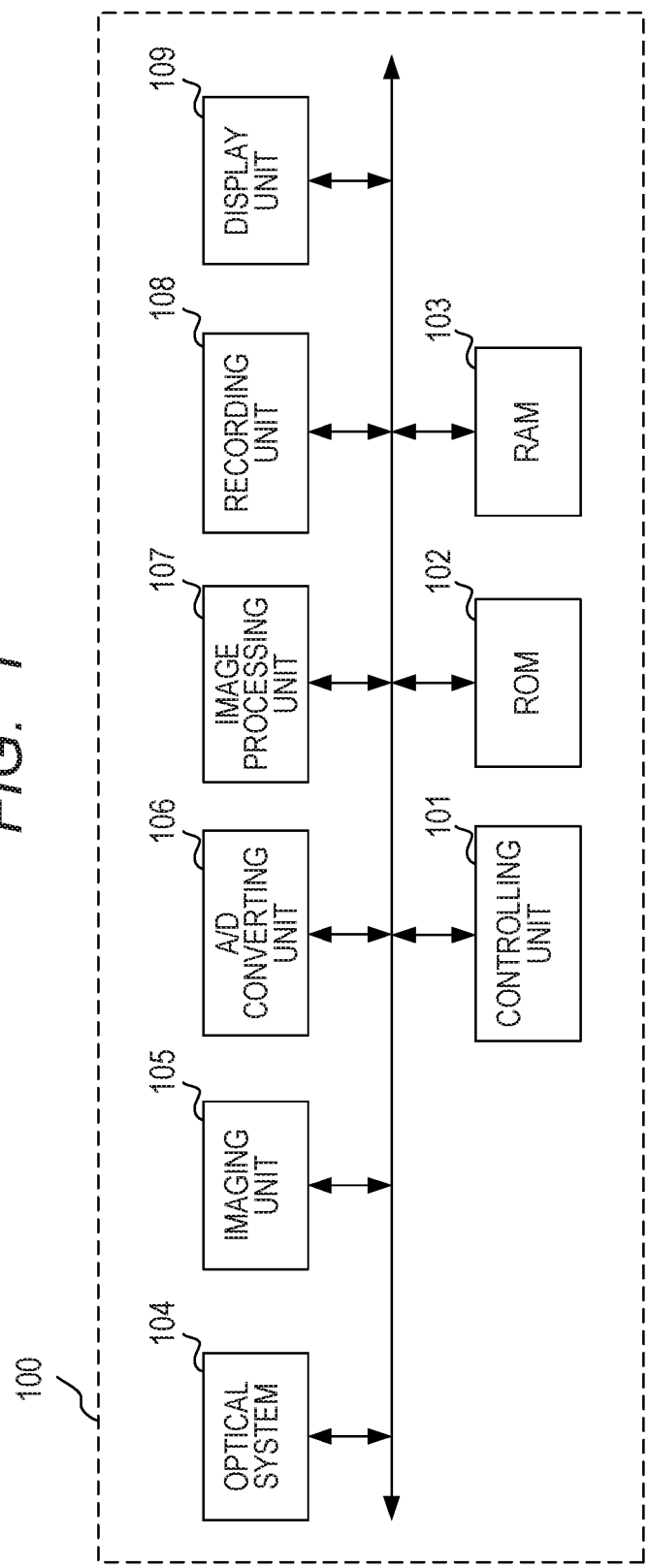
FIG. 1 is a diagram illustrating a schematic construction of an imaging apparatus according to an embodiment of an image processing apparatus.

FIG. 1 is a diagram illustrating a schematic construction of an imaging apparatus 100 of the embodiment. The imaging apparatus 100 of the embodiment has such a function that a motion blur is added to a moving image in which an exposure time of each imaging frame image is short by using an interpolation frame image, thereby generating a moving image whose motion is smooth.

In the imaging apparatus 100 illustrated in FIG. 1, a controlling unit 101 is, for example, a CPU. The controlling unit 101 reads out a controlling program to each block provided for the imaging apparatus 100 from a ROM 102, which will be described hereinafter, develops into a RAM 103, which will be described hereinafter, and executes. Thus, the controlling unit 101 controls the operation of each block provided for the imaging apparatus 100. The ROM 102 is an electrically erasable/recordable non-volatile memory. In addition to an operating program of each block provided for the imaging apparatus 100, parameters necessary for the operation of each block and the like are stored in the ROM 102. The RAM 103 is a rewritable volatile memory. The RAM 103 is used for development of the program which is executed by the controlling unit 101 or the like, temporary storage of data generated or the like by the operation of each block provided for the imaging apparatus 100, or the like.

An optical system 104 is constructed by a lens group including a zoom lens and a focus lens and forms an object image onto the imaging surface of an imaging unit 105, which will be described hereinafter. The imaging unit 105 is, for example, an imaging device such as CCD, CMOS sensor, or the like. The imaging unit 105 photoelectrically converts an optical image formed on the imaging surface of the imaging unit 105 by the optical system 104 and outputs an acquired analog image signal to an A/D converting unit 106. The A/D converting unit 106 converts the input analog image signal into digital image data. The digital image data output from the A/D converting unit 106 is temporarily stored into the RAM 103.

An image processing unit 107 executes various kinds of image processings such as white balance adjustment, color interpolation, gamma processing, and the like to the image data stored in the RAM 103. The image processing unit 107 has a smooth moving image generating unit 200, which will be described hereinafter. The image processing unit 107 generates a moving image with motion blur in which a motion blur has been added to the image stored in the RAM 103, that is, a moving image whose motion is smooth.

A recording unit 108 is a detachable memory card or the like. The recording unit 108 records the image data processed by the image processing unit 107 as a recording image through the RAM 103. The recording unit 108 can also output the recorded image data to the image processing unit 107 through the RAM 103. A display unit 109 is a display device such as an LCD or the like. The display unit 109 performs a display of the image stored in the RAM 103 or the image recorded in the recording unit 108, a display of an operation user interface image for receiving an instruction from the user, or the like.

The operation of the image processing unit 107 will be described in detail hereinbelow. In the embodiment, an example in which a moving image with motion blur (moving image whose motion is smooth) acquired by adding a motion blur to a moving image in which an exposure time of each imaging frame image is short by using an interpolation frame image will be described.

Figure 2:
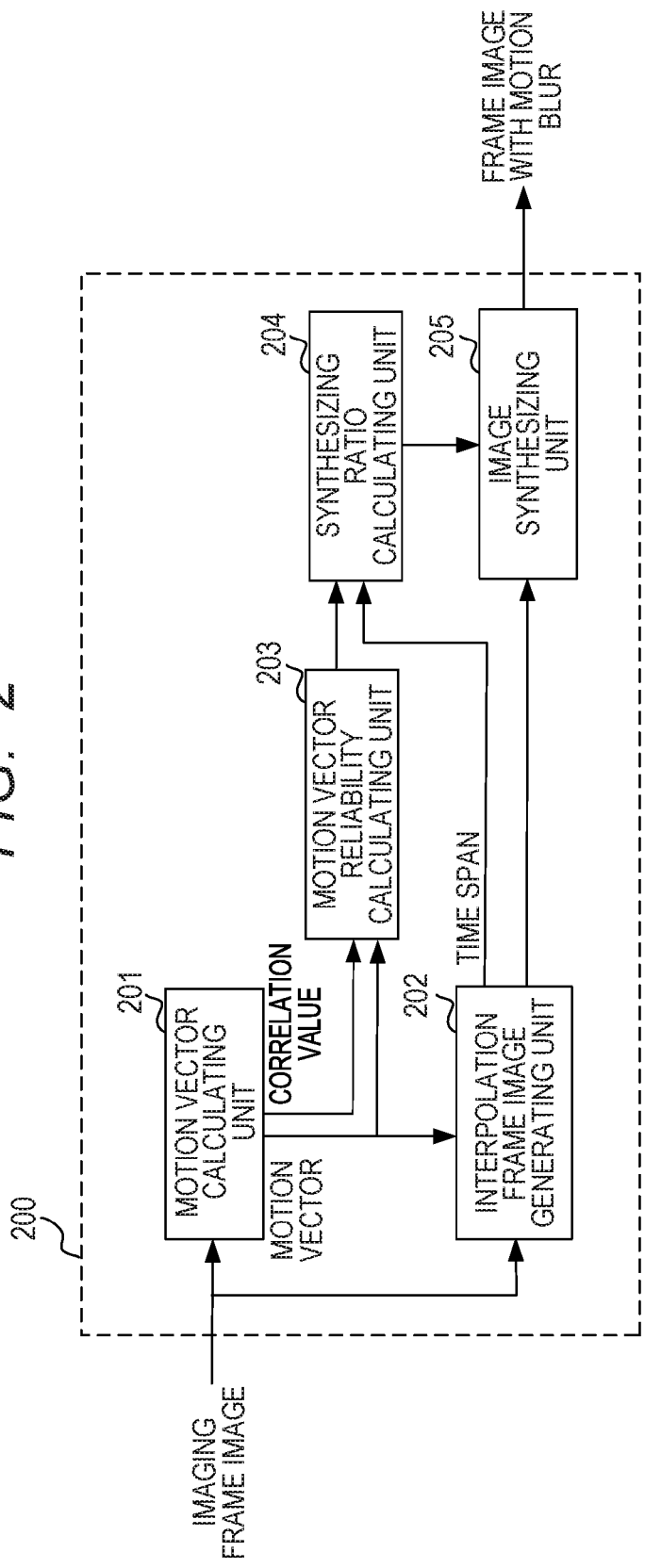
FIG. 2 is a diagram illustrating an example of a schematic construction of a smooth moving image generating unit.

FIG. 2 is a diagram illustrating an example of a schematic construction of the smooth moving image generating unit 200 provided for the image processing unit 107. The smooth moving image generating unit 200 adds a motion blur to the image data recorded in the recording unit 108, thereby generating a smooth moving image.

As illustrated in FIG. 2, the smooth moving image generating unit 200 is constructed by having a motion vector calculating unit 201, an interpolation frame image generating unit 202, a motion vector reliability calculating unit 203, a synthesizing ratio calculating unit 204, and an image synthesizing unit 205.

Figure 3:
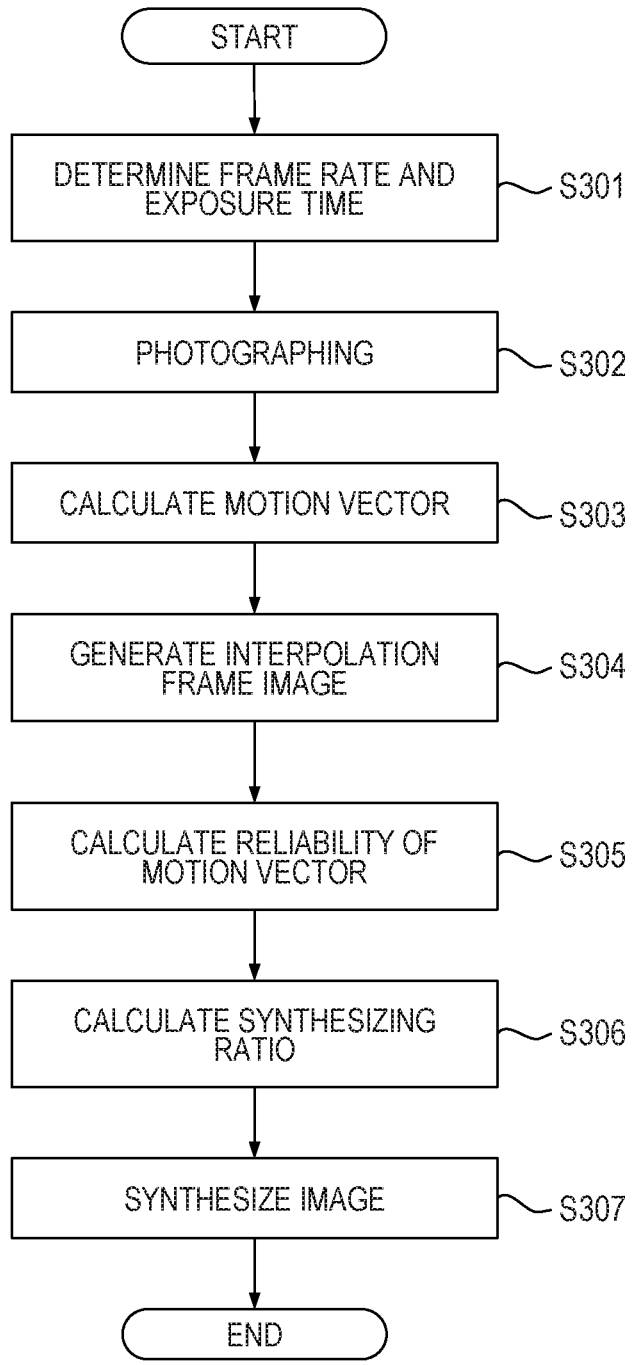
FIG. 3 is a flowchart illustrating a flow for a processing of the smooth moving image generating unit.

Processings of the smooth moving image generating unit 200 will be described hereinbelow with reference to a flowchart of FIG. 3. The processing of each step illustrated in the flowchart of FIG. 3 is realized by a method whereby the controlling unit 101 controls each unit of the imaging apparatus 100 on the basis of the program stored in the ROM 102 and the image processing is executed in the smooth moving image generating unit 200 of the image processing unit 107. The processings which do not need hardware among the processings of the steps in the flowchart of FIG. 3, for example, the image processings of steps S303 to S207 may be realized by a method whereby the CPU executes the program. This is true of other flowcharts, which will be described hereinlater.

In step S301 in FIG. 3, the controlling unit 101 determines an imaging frame rate at the time when the imaging unit 105 executes the imaging operation and an exposure time of each imaging frame. The user may determine the imaging frame rate and the exposure time through a user interface of the display unit 109. The controlling unit 101 may automatically determine the exposure time by automatic exposure control. As a deciding method of the exposure time by the automatic exposure control, for example, a method of determining the exposure time on the basis of a photometric value of each predetermined area of the image captured by the imaging unit 105 or the like can be mentioned. It is now assumed that the exposure time which is determined here is shorter than a time interval between the imaging frames at the imaging frame rate, although details will be described hereinlater. Therefore, in the imaging unit 105, a moving image in which each imaging frame image is constructed by an image in which a motion blur is small. After step S301, the controlling unit 101 advances the processing to step S302.

The processing of step S302 is executed by the imaging unit 105 under control of the controlling unit 101. In step S302, the imaging unit 105 photographs an optical image on the basis of the imaging frame rate and the exposure time determined by the controlling unit 101. The image data which was output from the imaging unit 105 and was A/D converted by the A/D converting unit 106 is temporarily stored in the RAM 103 and, thereafter, is image-processed by the image processing unit 107. The image data which was image-processed by the image processing unit 107 is temporarily stored in the RAM 103 and, thereafter, is recorded by the recording unit 108.

Figure 4:
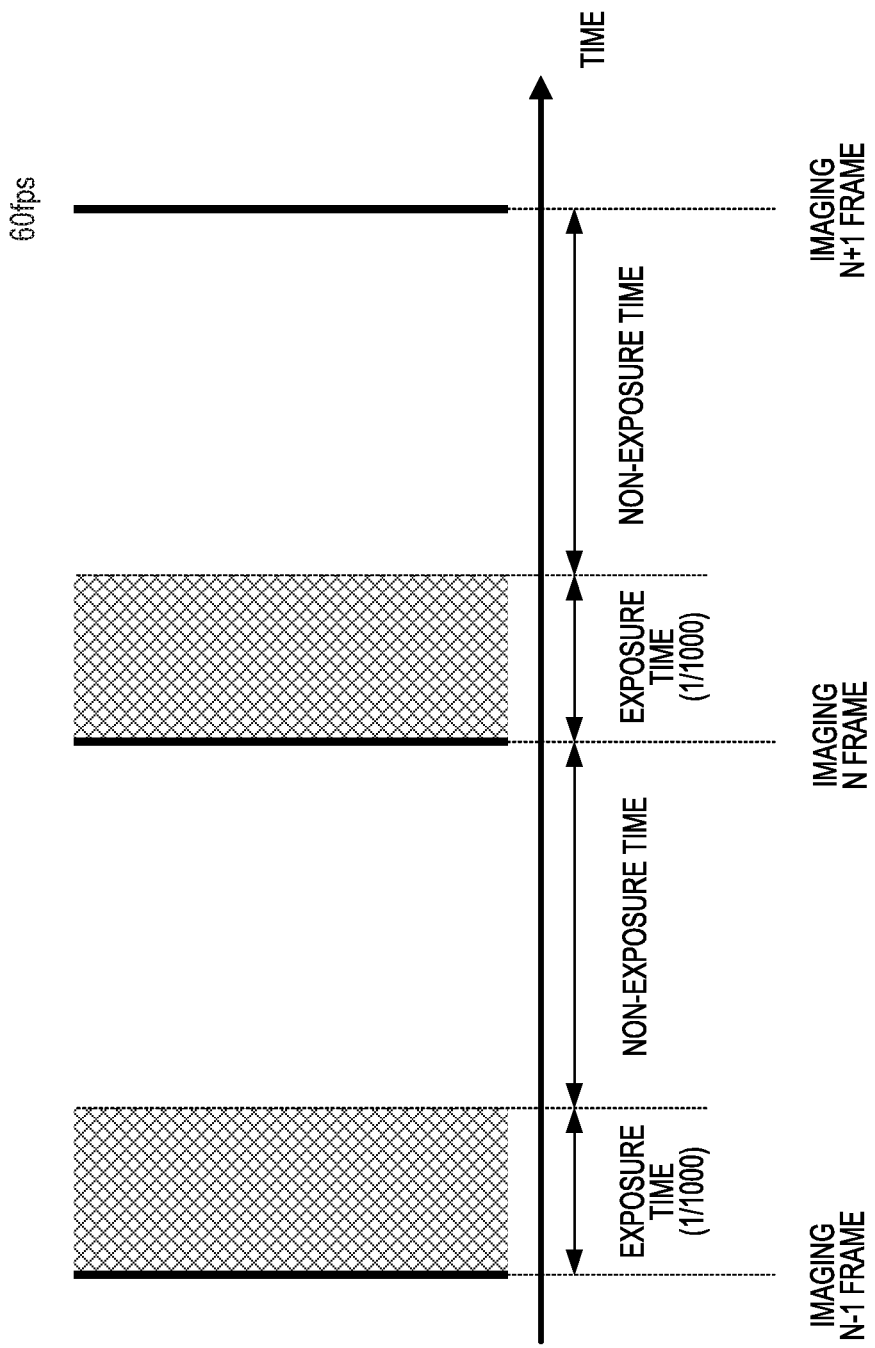
FIG. 4 is a diagram for use in description of imaging frames and an exposure time.

The moving image which is photographed by the imaging unit 105 will be described with reference to FIG. 4. FIG. 4 is a diagram illustrating an exposure time of each of, for example, an imaging N−1 frame, an imaging N frame, and an imaging N+1 frame photographed by the imaging unit 105 and a time interval between those imaging frames. It is now assumed that the imaging N−1 frame is an imaging frame which is one-frame precedent to the imaging N frame with respect to the time and the imaging N+1 frame is an imaging frame which is one-frame subsequent to the imaging N frame with respect to the time.

In the example of FIG. 4, the imaging frame rate is equal to 60 fps (frames/sec), the time interval between the imaging frames is equal to $\frac{1}{60}$, and the exposure time of each imaging frame of the imaging N−1 frame, the imaging N frame, and the imaging N+1 frame is equal to $\frac{1}{1000}$ second. That is, the exposure time ($\frac{1}{1000}$ second) of each imaging frame of the imaging N−1 frame, the imaging N frame, and the imaging N+1 frame is very shorter than the time interval ($\frac{1}{60}$ second) between the imaging frames. When the exposure time of each imaging frame is set to a very short time as mentioned above, the image of each imaging frame becomes an image in which the motion blur is small. Therefore, if the image of one desired frame is extracted from the photographed moving images, a still image in which the motion blur is small can be acquired.

On the other hand, if a moving image in which the exposure time of each imaging frame is very shorter than the time interval between the imaging frames is displayed, the motion blur of each imaging frame is not coupled and the image often becomes an unnatural image in which the motion of the object or the like is rough. Therefore, in the embodiment, by adding the motion blur to the moving object of the moving image, the smooth moving image can be generated, although details will be described hereinlater. As mentioned above, in the embodiment, both of the moving image whose motion is smooth and the still image in which the motion blur is small can be acquired.

A description is returned to the flowchart of FIG. 3. After step S302, the controlling unit 101 advances the processing routine to step S303. Each processing in step S303 and subsequent steps in FIG. 3 is executed by the image processing unit 107 under control of the controlling unit 101. The image processing unit 107 executes each processing in step S303 and subsequent steps by using the moving image data of one moving image file recorded in the recording unit 108 in step S302.

The processing in step S303 is executed by the motion vector calculating unit 201 in the smooth moving image generating unit 200 in FIG. 2 under control of the controlling unit 101. In step S303, the motion vector calculating unit 201 calculates a forward direction motion vector and a reverse direction motion vector between the imaging frame images of the moving image recorded in the recording unit 108. The motion vector calculating unit 201 outputs the calculated motion vectors in the forward direction and the reverse direction to the interpolation frame image generating unit 202 and the motion vector reliability calculating unit 203. The motion vector calculating unit 201 also outputs a correlation value corresponding to the calculated motion vectors in the forward direction and the reverse direction to the motion vector reliability calculating unit 203.

Figure 5:
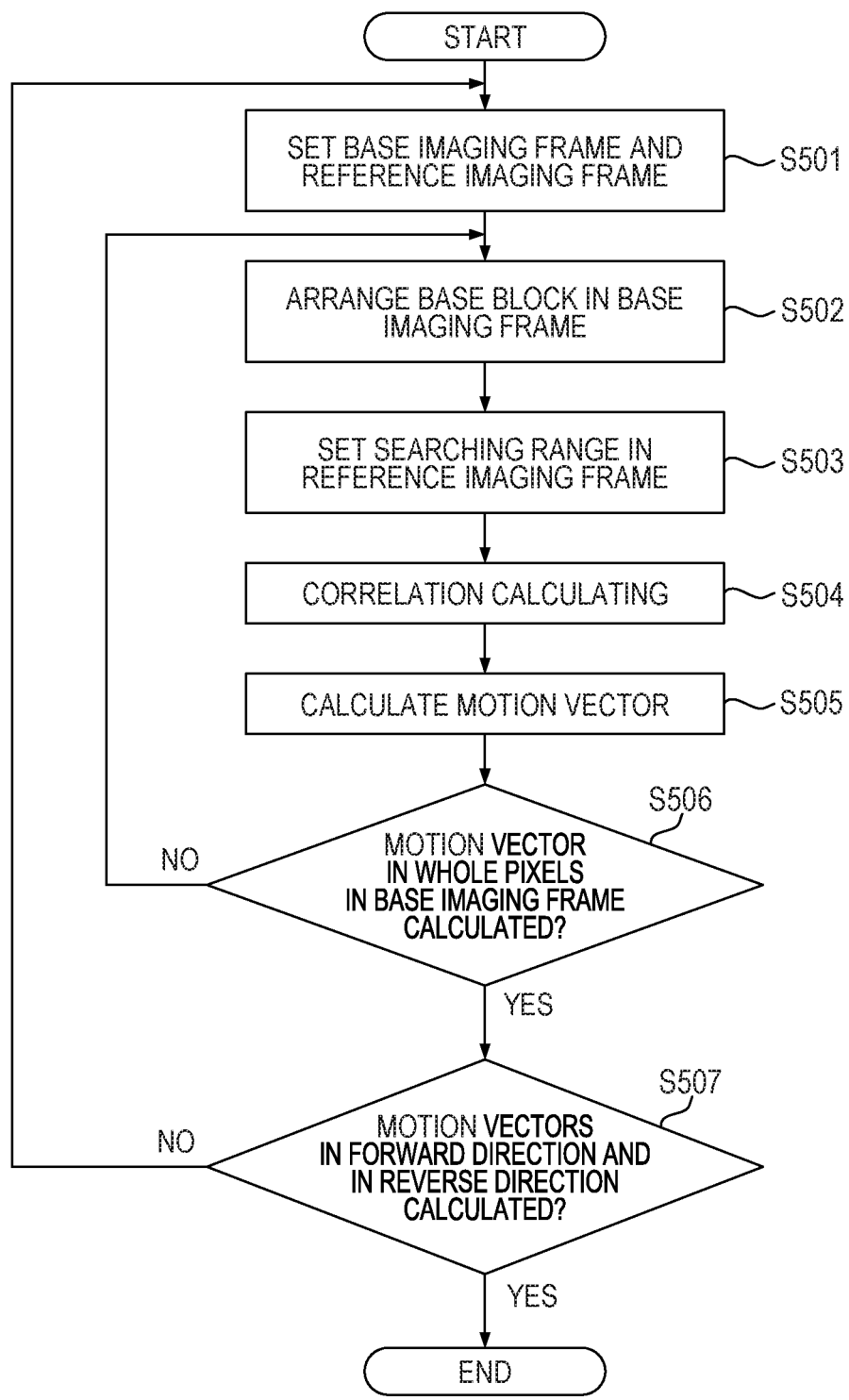
FIG. 5 is a flowchart illustrating a flow for a processing of a motion vector calculating unit.
Figure 6:
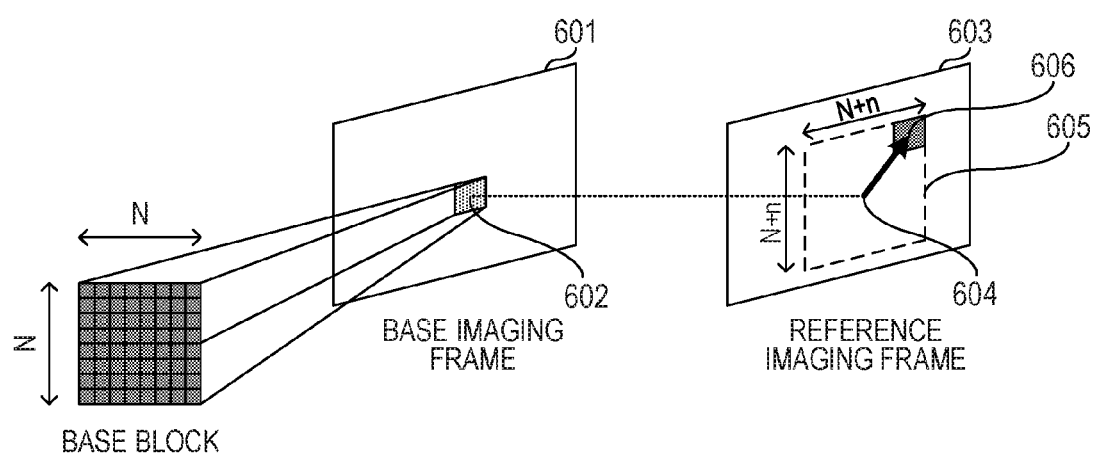
FIG. 6 is a diagram for use in description of a calculating method of motion vectors.

A calculating method of the motion vectors which is executed in step S303 will be described with reference to FIGS. 5 and 6. FIG. 5 is a flowchart illustrating a calculating processing of the motion vectors by the motion vector calculating unit 201. FIG. 6 is a diagram illustrating a calculating method of the motion vectors by a block matching method. Although an example in which the block matching method is used as a calculating method of the motion vectors will be described in the embodiment, the calculating method of the motion vectors is not limited to such an example but, for example, an optical flow method may be used.

In step S501 in the flowchart of FIG. 5, two imaging frame images which are adjacent with respect to the time in the moving image data recorded in the recording unit 108 are input to the motion vector calculating unit 201. When the motion vector in the forward direction is calculated, the motion vector calculating unit 201 sets the imaging frame which is precedent with respect to the time to a base imaging frame and sets the imaging frame which is subsequent with respect to the time to a reference imaging frame. When the motion vector in the reverse direction is calculated, the motion vector calculating unit 201 sets the imaging frame which is subsequent with respect to the time to a base imaging frame and sets the imaging frame which is precedent with respect to the time to a reference imaging frame. After step S501, the processing of the motion vector calculating unit 201 advances to step S502.

In step S502, the motion vector calculating unit 201 arranges a base block 602 of (N×N) pixels in a base imaging frame 601 as illustrated in FIG. 6. After step S502, the processing of the motion vector calculating unit 201 advances to step S503.

In step S503, the motion vector calculating unit 201 sets [(N+n)×(N+n)] pixels around same coordinates 604 as the center coordinates of the base block 602 of the base imaging frame 601 as a searching range 605 into a reference imaging frame 603. After step S503, the processing of the motion vector calculating unit 201 advances to step S504.

In step S504, the motion vector calculating unit 201 executes a correlation arithmetic operation between the base block 602 of the base imaging frame 601 and a reference block 606 of (N×N) pixels at different coordinates existing in the searching range 605 of the reference imaging frame 603 and calculates a correlation value. The correlation value is calculated based on an interframe difference absolute value sum to pixels in the base block 602 and the reference block 606. That is, the coordinates at which a value of the difference absolute value sum is smallest become coordinates at which the correlation value is biggest. A calculating method of the correlation value is not limited to the method of acquiring the difference absolute value sum but, for example, a method of calculating the correlation value based on a difference square sum or a normal cross correlation value may be used. It is assumed that in the example of FIG. 6, a state where the reference block 606 has the highest correlation is shown. After step S504, the processing of the motion vector calculating unit 201 advances to step S505.

In step S505, the motion vector calculating unit 201 calculates a motion vector on the basis of the coordinates of the reference block showing the highest correlation value obtained in step S504. In the case of the example of FIG. 6, in the searching range 605 of the reference imaging frame 603, the motion vector is acquired on the basis of the same coordinates 604 corresponding to the center coordinates of the base block 602 of the base imaging frame 601 and the center coordinates of the reference block 606. That is, the motion vector shown by the direction and distance from the same coordinates 604 to the center coordinates of the reference block 606 is acquired. After step S505, the processing of the motion vector calculating unit 201 advances to step S506.

In step S506, the motion vector calculating unit 201 discriminates whether or not the motion vector has been calculated with respect to all pixels of the base imaging frame 601. If it is determined that the motion vectors of all of the pixels are not yet calculated in step S506, the motion vector calculating unit 201 returns the processing to step S502. In step S502, the base block 602 of (N×N) pixels is arranged into the foregoing base imaging frame 601 while the pixel in which the motion vectors are not calculated is set to the center. Hereinbelow, in a manner similar to that mentioned above, the processings of steps S503 to S505 are executed. That is, while moving the base block 602 in FIG. 6, by repeating the processings of steps S502 to S505, the vector calculating unit 201 calculates the motion vectors of all of the pixels of the base imaging frame 601. The motion vector calculating unit 201 may calculate the motion vector every predetermined pixel instead of calculating the motion vectors of all of the pixels. After step S506, the processing of the motion vector calculating unit 201 advances to step S507.

In step S507, the motion vector calculating unit 201 discriminates whether or not the calculation of the motion vector in the forward direction and the motion vector in the reverse direction has been completed. If it is determined in step S507 that the calculation of either the motion vector in the forward direction or the motion vector in the reverse direction is not completed, the motion vector calculating unit 201 returns the processing to step S501. In step S501, with respect to the pixel in which the calculation of either the motion vector in the forward direction or the motion vector in the reverse direction is not completed, the base imaging frame and the reference imaging frame are set in a manner similar to that mentioned above. For example, if the calculation of the motion vector in the reverse direction is not completed, the imaging frame which is subsequent with respect to the time is set to the base imaging frame, and the imaging frame which is precedent with respect to the time is set to the reference imaging frame. After that, in a manner similar to that mentioned above, the processings of steps S502 to S506 are executed. If it is determined in step S507 that the calculation of the motion vector in the forward direction and the motion vector in the reverse direction has been completed, the motion vector calculating unit 201 finishes the processings of the flowchart of FIG. 5.

The processings mentioned above relate to the processings to two imaging frame images which are adjacent with respect to the time. The processings of the flowchart of FIG. 5 are executed every two adjacent imaging frames in the moving image data of one moving image file recorded in the recording unit 108. That is, in the motion vector calculating unit 201, the motion vectors are calculated by the foregoing method with respect to all imaging frames constructing the moving image.

A description is returned to the flowchart of FIG. 3. After step S303, the controlling unit 101 advances the processing to step S304. The processing of step S304 is executed by the interpolation frame image generating unit 202 under control of the controlling unit 101. In step S304 in FIG. 3, the interpolation frame image generating unit 202 generates an interpolation frame image on the basis of the imaging frame images and the motion vectors.

Figure 7:
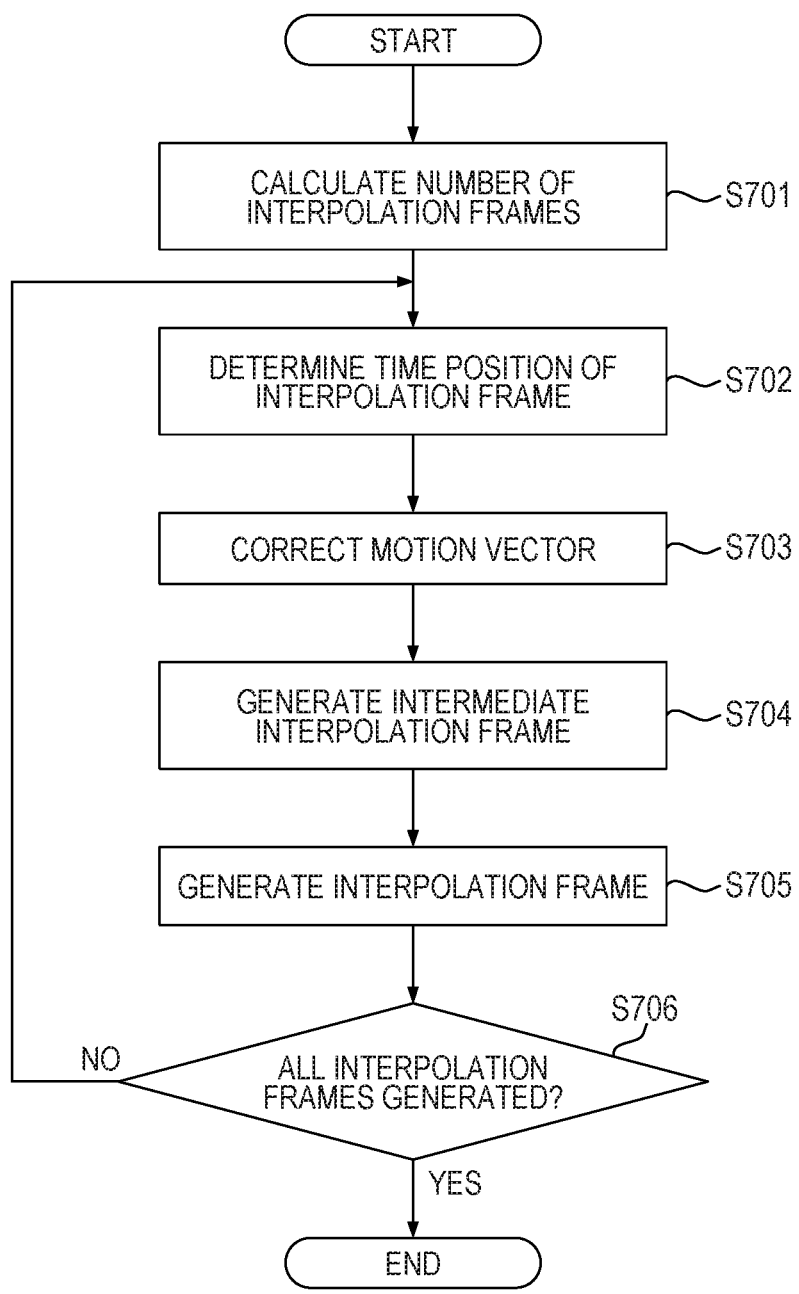
FIG. 7 is a flowchart illustrating a flow for a processing of an interpolation frame image generating unit.
Figure 8:
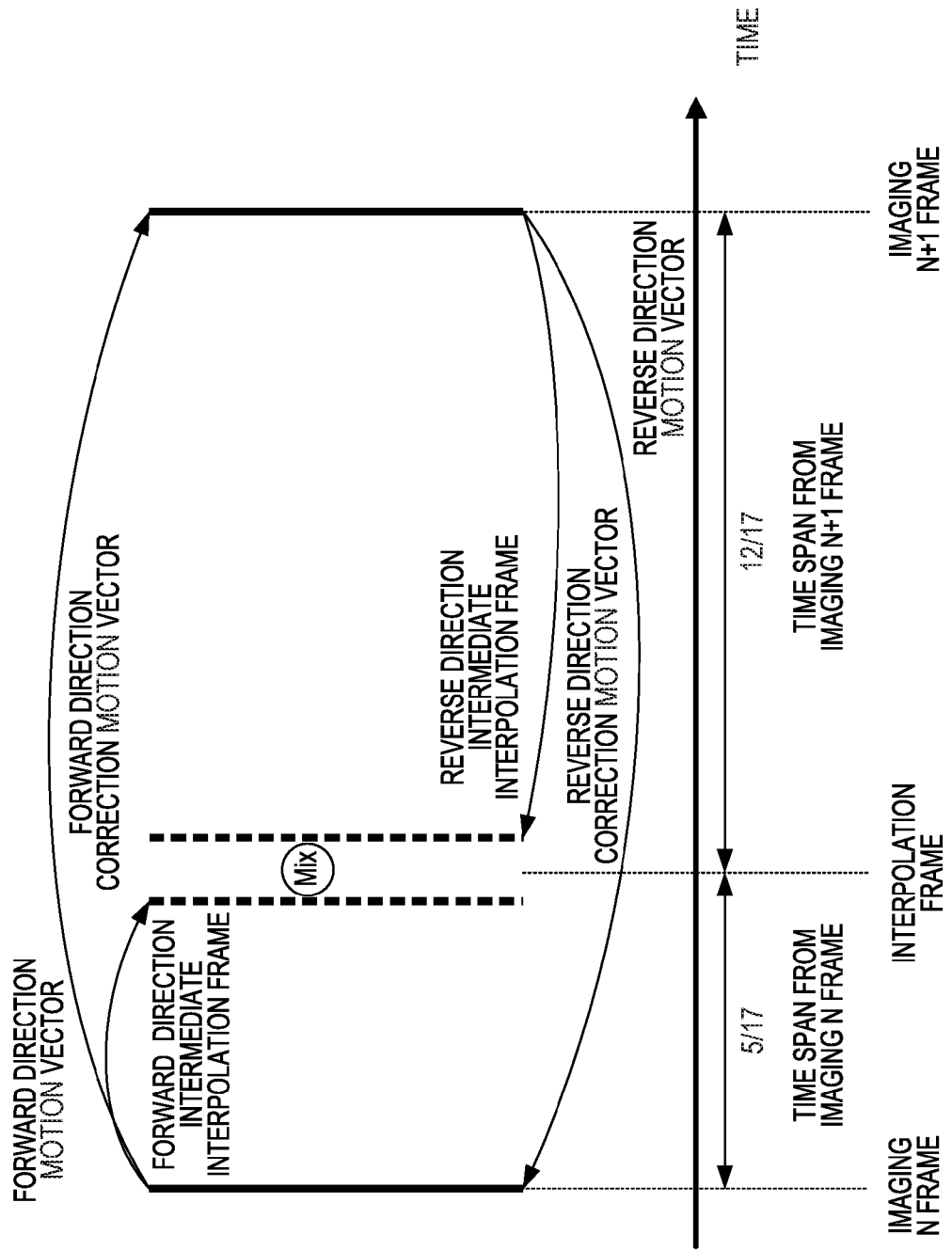
FIG. 8 is a diagram for use in description of a generating method of an interpolation frame image.

The generation of the interpolation frame image which is executed in the interpolation frame image generating unit 202 will be described with reference to FIGS. 7 and 8. FIG. 7 is a flowchart illustrating a generating processing of the interpolation frame image which is executed by the interpolation frame image generating unit 202. FIG. 8 is a diagram for use in description of a method of generating the interpolation frame image on the basis of, for example, the imaging N frame image and the imaging N+1 frame image.

In step S701 in FIG. 7, the interpolation frame image generating unit 202 determines the number of interpolation frames which are generated between the imaging N frame image and the imaging N+1 frame image in FIG. 8. Specifically speaking, the interpolation frame image generating unit 202 determines the number of interpolation frames in accordance with the time between the adjacent imaging frames and the exposure time of the imaging frame as shown by the following equation (1).

The number of interpolation frames=(time between the adjacent imaging frames/exposure time of the imaging frame)−1  (1)

The number of interpolation frames is determined by executing a rounding processing such as an omission of fraction or the like so that it becomes an integer. For example, when the imaging frame rate is equal to 60 frames/sec (time between the adjacent imaging frames is equal to 1/60) and the exposure time of the imaging frame is equal to 1/1000, the number of interpolation frames is equal to 16. After step S701, the processing of the interpolation frame image generating unit 202 advances to step S702.

In step S702, the interpolation frame image generating unit 202 determines a time position of each interpolation frame which is generated between the imaging N frame and the imaging N+1 frame in FIG. 8. Specifically speaking, the interpolation frame image generating unit 202 determines the time position of each interpolation frame in such a manner that the interpolation frames of the number calculated in step S701 are generated at a uniform time interval in the time interval between the imaging N frame and the imaging N+1 frame. After step S702, the processing of the interpolation frame image generating unit 202 advances to step S703.

In step S703, the interpolation frame image generating unit 202 corrects the foregoing motion vectors in accordance with the time position of each interpolation frame determined in step S702. The correction of the motion vectors will now be described with reference to FIG. 8. FIG. 8 illustrates an example in which assuming that the time between the adjacent imaging frames is equal to "1", the interpolation frame is generated at a position distant from the imaging N frame by 5/17 with respect to the time. To the interpolation frame corresponding to such a time position, the interpolation frame image generating unit 202 performs such a correction that a length of the forward direction motion vector from the imaging N frame to the imaging N+1 frame is multiplied by 5/17. Similarly, the interpolation frame image generating unit 202 performs such a correction that a length of the reverse direction motion vector from the imaging N+1 frame to the imaging N frame is multiplied by 12/17. The processing for correcting the length of the motion vector is a processing corresponding to the gain correction. In this manner, the interpolation frame image generating unit 202 executes the gain processing according to the time position of the interpolation frame to the length of the motion vector and calculates the forward direction correction motion vector and the reverse direction correction motion vector. After step S703, the processing of the interpolation frame image generating unit 202 advances to step S704.

In step S704, the interpolation frame image generating unit 202 generates a forward direction intermediate interpolation frame image on the basis of the imaging N frame and the forward direction correction motion vector as illustrated in FIG. 8. The interpolation frame image generating unit 202 also generates a reverse direction intermediate interpolation frame image on the basis of the imaging N+1 frame image and the reverse direction correction motion vector.

A method whereby the interpolation frame image generating unit 202 generates the forward direction intermediate interpolation frame image on the basis of the imaging N frame and the forward direction correction motion vector will be described hereinbelow.

In order to generate a pixel value at interpolation target coordinates of the interpolation frame image, first, the interpolation frame image generating unit 202 detects the forward direction correction motion vector in which vector end coordinates exist near the interpolation target coordinates among the forward direction correction motion vectors in the imaging N frame image. The interpolation frame image generating unit 202 sets a pixel value of the imaging N frame image at the start coordinates of the detected forward direction correction motion vector to the pixel value at the interpolation target coordinates. When the end coordinates of the forward direction correction motion vector do not exist near the interpolation target coordinates, it is regarded that the pixel at the interpolation target coordinates of the interpolation frame image is a dropout pixel, and the interpolation frame image generating unit 202 sets such a pixel value to "0".

Subsequently, a method whereby the interpolation frame image generating unit 202 generates the reverse direction intermediate interpolation frame image on the basis of the imaging N+1 frame image and the reverse direction correction motion vector will be described hereinbelow.

In order to generate a pixel value at the interpolation target coordinates of the interpolation frame image, first, the interpolation frame image generating unit 202 detects the reverse direction correction motion vector in which vector end coordinates exist near the interpolation target coordinates among the reverse direction correction motion vectors in the imaging N+1 frame image. The interpolation frame image generating unit 202 sets a pixel value of the imaging N+1 frame image at the start coordinates of the detected reverse direction correction motion vector to the pixel value at the interpolation target coordinates. When the end coordinates of the reverse direction correction motion vector do not exist near the interpolation target coordinates, it is regarded that the pixel at the interpolation target coordinates of the interpolation frame image is a dropout pixel, and the interpolation frame image generating unit 202 sets such a pixel value to "0". After step S704, the processing of the interpolation frame image generating unit 202 advances to step S705.

In step S705, the interpolation frame image generating unit 202 generates an interpolation frame image by synthesizing the forward direction intermediate interpolation frame image and the reverse direction intermediate interpolation frame image on the basis of the time position of the interpolation frame image and dropout pixel information.

An intermediate interpolation frame synthesizing processing in which the interpolation frame image generating unit 202 synthesizes the forward direction intermediate interpolation frame image and the reverse direction intermediate interpolation frame image will be described hereinbelow.

When both of the pixels of the intermediate interpolation frame images in the forward direction and the reverse direction at the interpolation target coordinates of the interpolation frame image are not the dropout pixels, the interpolation frame image generating unit 202 synthesizes the same coordinate pixel values of the intermediate interpolation frame images in the forward direction and the reverse direction. The interpolation frame image generating unit 202 sets the synthesized same coordinate pixel value to the pixel value of the intermediate frame image. A synthesizing ratio at the time of synthesizing the same coordinate pixel values (hereinbelow, referred to as an intermediate synthesizing ratio) is calculated in accordance with the time position of the forward direction intermediate interpolation frame to the imaging N frame and the time position of the reverse direction intermediate interpolation frame to the imaging N+1 frame. Specifically speaking, the interpolation frame image generating unit 202 calculates time spans of the interpolation frames from the imaging N frame and the imaging N+1 frame, and acquires the intermediate synthesizing ratio which increases as the time span is smaller. FIG. 8 illustrates an example in which when a time interval between the imaging N frame and the imaging N+1 frame is equal to "1", the interpolation frame image is generated at the time position which is distant from the imaging N frame by $5/17$ and is distant from the imaging N+1 frame by $12/17$. In this case, the interpolation frame image generating unit 202 sets the intermediate synthesizing ratio of the forward direction intermediate interpolation frame image to $12/17$ and sets the intermediate synthesizing ratio of the reverse direction intermediate interpolation frame image to $5/17$ and synthesizes their same coordinate pixel values.

When any one of the pixels of the intermediate interpolation frame images in the forward direction and the reverse direction at the interpolation target coordinates of the interpolation frame image is the dropout pixel, the interpolation frame image generating unit 202 sets the pixel value of the other pixel which is not the dropout pixel to the pixel value of the interpolation frame image. When both of the pixels of the intermediate interpolation frame images in the forward direction and the reverse direction at the interpolation target coordinates are the dropout pixels, the interpolation frame image generating unit 202 sets an average value of a plurality of pixel values of the pixels which are not the dropout pixels in the neighboring region of the interpolation target coordinates to the pixel value of the interpolation frame image. After step S705, the processing of the interpolation frame image generating unit 202 advances to step S706.

In step S706, the interpolation frame image generating unit 202 discriminates whether or not the generation of all interpolation frame images of the number calculated in step S701 has been completed. If it is determined that the generation of all of the interpolation frame images is not completed yet, the interpolation frame image generating unit 202 returns the processing to step S702. In this case, in step S702, the time position is determined with respect to the interpolation frame which is not generated yet. After that, processings in steps S703 to S705 are executed. In this manner, if the generation of all of the interpolation frame images is not completed yet, the interpolation frame image generating unit 202 repeats the processings in steps S702 to S705. If it is determined that the generation of all of the interpolation frame images has been completed, the interpolation frame image generating unit 202 finishes the processings of the flowchart of FIG. 7.

Figure 9A:
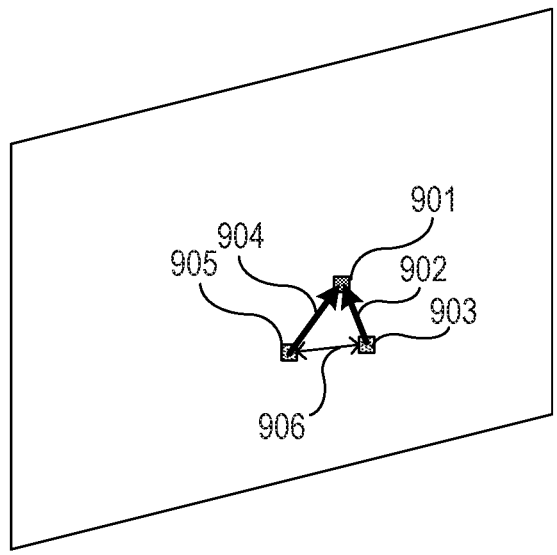
FIGS. 9A and 9B are diagrams for use in description of collapsing of an intermediate interpolation frame.
Figure 9B:
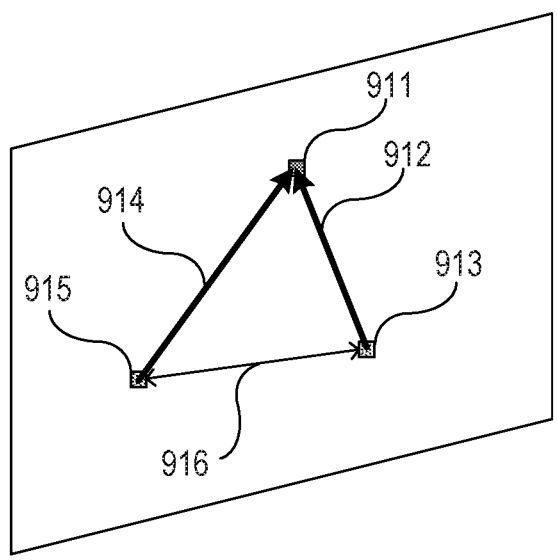

For example, if the interpolation frame image was generated by using the wrong motion vector, an interpolation frame image which reproduces the correct motion cannot be generated. In this case, the moving image displayed on the display unit 109 is observed as such a collapsed moving image that the object on the interpolation frame image is separated or transmitted. Specific examples of such collapsing generated in the interpolation frame image will be described with reference to FIGS. 9A and 9B. FIGS. 9A and 9B are diagrams illustrating a state of generation of the intermediate interpolation frame image using the motion vector corrected in step S703 in FIG. 7. FIGS. 9A and 9B are diagrams illustrating a difference between the case where the correct correction motion vector is used and the case where the wrong correction motion vector is used. Since the following description is also applied to both of the forward direction correction motion vector and the reverse direction correction motion vector, they are not distinguished here but are merely expressed as a correction motion vector. Similarly, the forward direction intermediate interpolation frame and the reverse direction intermediate interpolation frame are not distinguished but are merely expressed as an intermediate interpolation frame.

FIG. 9A is a diagram illustrating the intermediate interpolation frame image at the time position closer to the imaging frame. The example of FIG. 9A illustrates relations among interpolation target coordinates 901, a correct correction motion vector 902 in which the end coordinates of the motion vector exist at the interpolation target coordinates 901, and a wrong correction motion vector 904 in which the end coordinates of the motion vector exist at the interpolation target coordinates 901.

As mentioned above, in step S704 in FIG. 7, the interpolation frame image generating unit 202 detects a correction motion vector in which the end coordinates of the correction motion vector exist near the interpolation target coordinates at the time of generation of the intermediate interpolation frame image. The interpolation frame image generating unit 202 sets the pixel value of the imaging frame image at the start coordinates of the detected correction motion vector to the pixel value at the interpolation target coordinates. In FIG. 9A, the correct value of the pixel value at the interpolation target coordinates 901 is the pixel value of the imaging frame at start coordinates 903 of the correct correction motion vector 902. On the other hand, when the wrong correction motion vector 904 is used, the pixel value at the interpolation target coordinates 901 is the pixel value of the imaging frame image at start coordinates 905 of the wrong correction motion vector 904. That is, the pixel value at the start coordinates 905 of the wrong correction motion vector 904 corresponding to the coordinates which are distant from the start coordinates 903 of the correct correction motion vector 902 by a distance 906 is set to the pixel value at the interpolation target coordinates 901.

FIG. 9B is a diagram illustrating the intermediate interpolation frame at the time position distant from the imaging frame. The example of FIG. 9B illustrates relations among interpolation target coordinates 911, a correct correction motion vector 912 in which an end point of the motion vector exists at the interpolation target coordinates 911, and a wrong correction motion vector 914 in which an end point of the motion vector exists at the interpolation target coordinates 911.

In FIG. 9B, a correct value of the pixel value at the interpolation target coordinates 911 is a pixel value of the imaging frame image at start coordinates 913 of the correct correction motion vector 912. If the wrong correction motion vector 914 is used here, the pixel value at the interpolation target coordinates 911 is a pixel value of the imaging frame image at start coordinates 915 of the wrong correction motion vector 914. In other words, the pixel value at the start coordinates 915 of the wrong correction motion vector 914 corresponding to coordinates distant from the start coordinates 913 of the correct correction motion vector 912 by a distance 916 is regarded as a pixel value at the interpolation target coordinates 911.

When comparing the distance 906 in FIG. 9A with the distance 916 in FIG. 9B, the distance 916 is longer. This is because when the intermediate interpolation frame image at the time position distant from the imaging frame is generated, a gain at the time of calculating the correction motion vector is larger. That is, there is such a tendency that in the case of the intermediate interpolation frame image which is generated by using the long interpolation motion vector, a distance between the start coordinates of the correct correction motion vector and the start coordinates of the wrong correction motion vector is longer. Since the image generally has such characteristics that the value of the pixel existing at the closer coordinates has a higher correlation, if the value of the pixel existing at a position distant from the correct coordinates is set to the pixel value at the interpolation target coordinates, a possibility of collapsing is higher. There is, consequently, such a tendency that the collapsing of the intermediate interpolation frame image at the time position closer to the imaging frame in the case where the distance 906 is short is more inconspicuous and the collapsing of the intermediate interpolation frame image at the time position distant from the imaging frame in the case where the distance 916 is long is more conspicuous.

Therefore, in order to make such a collapsing inconspicuous, as mentioned above, in step S705 in FIG. 7, the interpolation frame image generating unit 202 performs the synthesization at a higher intermediate synthesizing ratio as a time span between the imaging frame and the interpolation frame is smaller.

The smooth moving image generating unit 200 in the embodiment executes, every imaging frame, such a processing that each interpolation frame image generated as mentioned above is synthesized to the imaging frame image, thereby generating the moving image with motion blur.

However, for example, such a possibility that the interpolation frame image in which the time spans from both of the imaging N frame and the imaging N+1 frame are long, that is, each interpolation frame image at the time position closer to the intermediate position of the imaging frame becomes an interpolation frame image whose collapsing is most conspicuous as will be described hereinlater is high.

In the embodiment, by considering such a phenomenon that the collapsing is conspicuous in the interpolation frame image in which the time spans from both of the imaging N frame and the imaging N+1 frame are long, the smooth moving image generating unit 200 determines a synthesizing ratio of the imaging frame image and each interpolation frame image. Although details will be described hereinlater, in the embodiment, the synthesizing ratio at the time of synthesizing the imaging frame image and each interpolation frame image is determined on the basis of a degree of collapsing of the interpolation frame image. The degree of collapsing of the interpolation frame image is acquired on the basis of the time spans between the adjacent imaging frame images which are precedent and subsequent with respect to the time and each interpolation frame image and a reliability of the motion vector. That is, as mentioned above, the longer the time span between the imaging frame and each interpolation frame is, the interpolation frame image is liable to be collapsed. Also when the reliability of the motion vector, which will be described hereinlater, is low, a possibility of collapsing of the interpolation frame image is high. Therefore, in the embodiment, as will be described hereinlater, the degree of collapsing of the interpolation frame is acquired based on the time span between the imaging frame image and each interpolation frame and the reliability of the motion vector. The synthesizing ratio is determined based on the degree of collapsing.

The synthesizing ratio at the time of synthesizing the imaging frame image and each interpolation frame image in the smooth moving image generating unit 200 of the embodiment will be described in detail hereinbelow.

A description is returned to the flowchart of FIG. 3. After step S304, the controlling unit 101 advances the processing routine to step S305. The processing of step S305 is executed in the motion vector reliability calculating unit 203 under control of the controlling unit 101. In step S305, the motion vector reliability calculating unit 203 calculates the reliabilities of the motion vectors in the forward direction and the reverse direction every imaging frame on the basis of at least one of the motion vector acquired by the motion vector calculating unit 201 and the correlation value acquired at the time of calculation of the motion vector. Although details will be described hereinlater, the motion vector reliability calculating unit 203 calculates the reliabilities of the motion vectors in the forward direction and the reverse direction by the sum of a variation reliability based on the variation of the motion vector of each pixel in a neighboring region of the target pixel and a correlation value reliability based on the correlation value. Since the reliabilities of the motion vectors are similarly acquired even in the case of the motion vector in either the forward direction or the reverse direction, they are not distinguished here but are merely expressed as a reliability of the motion vector.

Figure 10A:
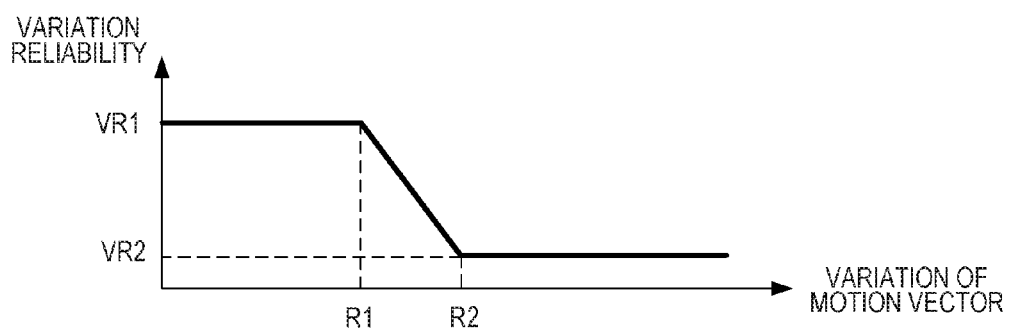
FIGS. 10A and 10B are diagrams for use in description of a calculating method of a reliability of a motion vector.

First, the variation reliability based on the variation of the motion vector in the neighboring region will be described with reference to FIG. 10A.

The motion vector reliability calculating unit 203 calculates variation reliabilities of the motion vectors on the basis of the sum of a variation reliability of a length of motion vector and a variation reliability of the direction of the motion vector in the neighboring region of the target pixel of the imaging frame. Specifically speaking, the motion vector reliability calculating unit 203 calculates a variation of the length of the motion vector and a variation of the direction of the motion vector on the basis of a standard deviation of the length of the motion vector and a standard deviation of the direction of the motion vector in the neighboring region of the target pixel. Further, the motion vector reliability calculating unit 203 acquires a variation reliability of the length of the motion vector and a variation reliability of the direction of the motion vector on the basis of variation reliability characteristics as illustrated in FIG. 10A. For example, in the case of the variation of the length of the motion vector, when a value of the variation of the length of the motion vector is equal to or less than a predetermined value R1, a high variation reliability VR1 is acquired. When the value of the variation of the length of the motion vector is equal to or larger than a predetermined value R2 (R1<R2), a low variation reliability VR2 is acquired. If the value of the variation of the length of the motion vector is larger than the predetermined value R1 and is less than the predetermined value R2, a variation reliability corresponding to the value of the variation of the length of the motion vector within a range between the variation reliabilities VR1 and VR2 is acquired. As for the variation reliability characteristics in FIG. 10A, the same characteristics may be set for the variation of the length of the motion vector and the variation of the direction of the motion vector or the different characteristics may be set for them. The variation reliability characteristics in FIG. 10A may be preliminarily prepared or may be generated by the motion vector reliability calculating unit 203. In the motion vector reliability calculating unit 203, roughly, the smaller the variation of the length of the motion vector is, the higher variation reliability is determined on the basis of the variation reliability characteristics in FIG. 10A. Similarly, in the motion vector reliability calculating unit 203, roughly, the smaller the variation of the direction of the motion vector is, the higher variation reliability is determined on the basis of the variation reliability characteristics in FIG. 10A. The motion vector reliability calculating unit 203 calculates a sum of the variation reliability of the length of the motion vector and the variation reliability of the direction of the motion vector as a variation reliability of the motion vector.

Figure 10B:
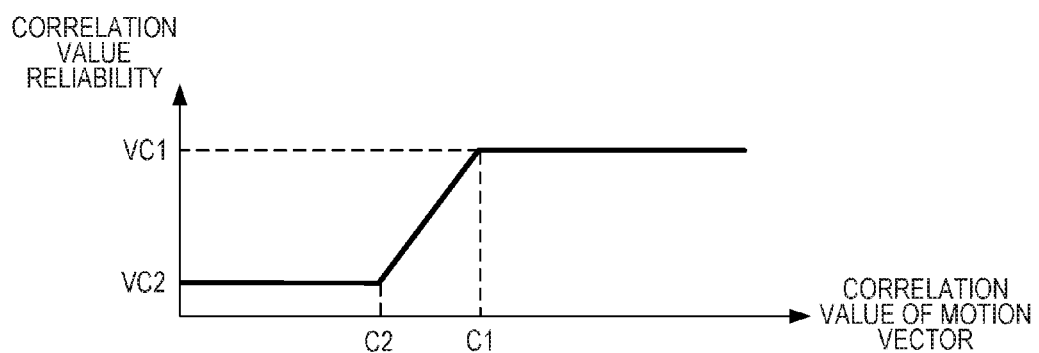

Subsequently, a correlation value reliability based on the correlation value of the motion vector in the neighboring region will be described with reference to FIG. 10B.

The motion vector reliability calculating unit 203 calculates a correlation value reliability on the basis of the correlation value of the motion vector calculated in step S505 in FIG. 5. Specifically speaking, the motion vector reliability calculating unit 203 acquires the correlation value reliability of the motion vector on the basis of, for example, the correlation value reliability characteristics as illustrated in FIG. 10B. The correlation value reliability characteristics illustrated in FIG. 10B may be preliminarily prepared or may be generated by the motion vector reliability calculating unit 203. For example, when the correlation value of the motion vector is equal to or larger than a predetermined value C1, a high correlation value reliability VC1 is acquired. When it equal to or less than a predetermined value C2 (C2<C1), a low correlation value reliability VC2 is acquired. If the correlation value of the motion vector is larger than the predetermined value C2 and is less than the predetermined value C1, a correlation value reliability corresponding to the correlation value of the motion vector within a range between the correlation value reliabilities VC2 and VC1 is acquired. That is, in the motion vector reliability calculating unit 203, roughly, the larger the correlation value of the motion vector is, the higher correlation value reliability is determined on the basis of the correlation value reliability characteristics in FIG. 10B.

Further, the motion vector reliability calculating unit 203 calculates the reliability of the motion vector by the sum of the variation reliability of the motion vector and the correlation value reliability of the motion vector acquired as mentioned above. In the motion vector reliability calculating unit 203, a value obtained by averaging the motion vector reliabilities calculated for the respective motion vectors of the respective pixels of the imaging frame in the whole imaging frame is set to the motion vector reliability of such an imaging frame. In this manner, the motion vector reliability calculating unit 203 calculates the reliability of the motion vector as mentioned above to each of the motion vectors in the forward direction and the reverse direction.

Although the example in which the average of the reliabilities of the respective motion vectors is acquired and is set to the reliability of the motion vector has been described above, the calculating method of the reliability of the motion vector is not limited to it. For instance, in addition to the processing for acquiring the average of the reliabilities of the respective motion vectors, the motion vector reliability calculating unit 203 may adjust the reliability of the motion vector in consideration of a minimum value of the reliabilities of the respective motion vectors in the whole imaging frame. In the case of such an example, for instance, control can be made in such a manner that when a region where the reliability is low exists locally, the motion vector reliability in the whole imaging frame is decreased.

When the reliabilities of the respective motion vectors are averaged in the whole imaging frame as mentioned above, if the reliability of the motion vector satisfies any one of the following first to third conditions, the reliability of the motion vector corresponding to such a condition may be excluded.

First condition: A size of region where the motion vector reliability is low is smaller than a predetermined value.
    Second condition: The region where the motion vector reliability is low is located within a predetermined range from an edge of a display screen.
    Third condition: The region where the motion vector reliability is low is located in a region distant from the main object.

A description is returned to the flowchart of FIG. 3. After step S305, the controlling unit 101 advances the processing routine to step S306. A processing of step S306 is executed by the synthesizing ratio calculating unit 204 under control of the controlling unit 101.

In step S306 in FIG. 3, the synthesizing ratio calculating unit 204 calculates a synthesizing ratio of the imaging N frame image and each interpolation frame image on the basis of the reliability of the motion vector and a time span between the imaging frame and each interpolation frame. That is, the synthesizing ratio calculating unit 204 discriminates a degree of collapsing of the interpolation frame on the basis of the time span between the imaging frame image and each interpolation frame image and the reliability of the motion vector, and determines the synthesizing ratio on the basis of the degree of collapsing.

Subsequently, a method of calculating the synthesizing ratio of the imaging N frame image and each interpolation frame on the basis of the reliability of the motion vector and the time span between the imaging frame and each interpolation frame will be described with reference to FIGS. 11A to 11D.

Figure 11A:
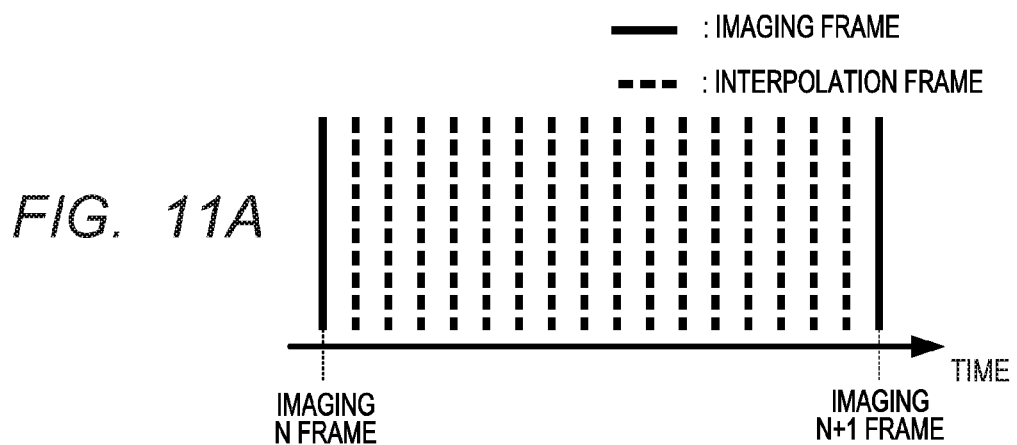
FIGS. 11A, 11B, 11C and 11D are diagrams for use in description of a calculating method of a synthesizing ratio.
Figure 11B:
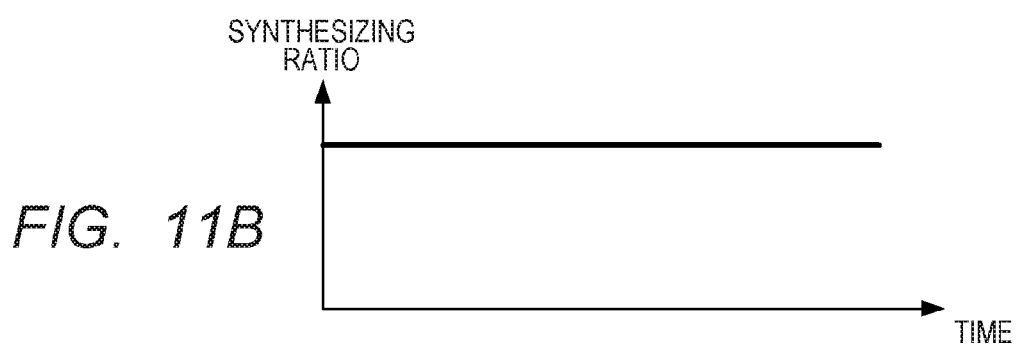
Figure 11C:
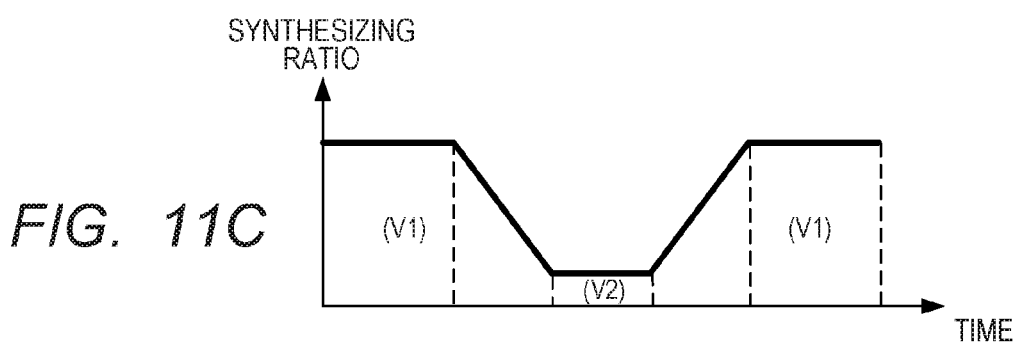
Figure 11D:
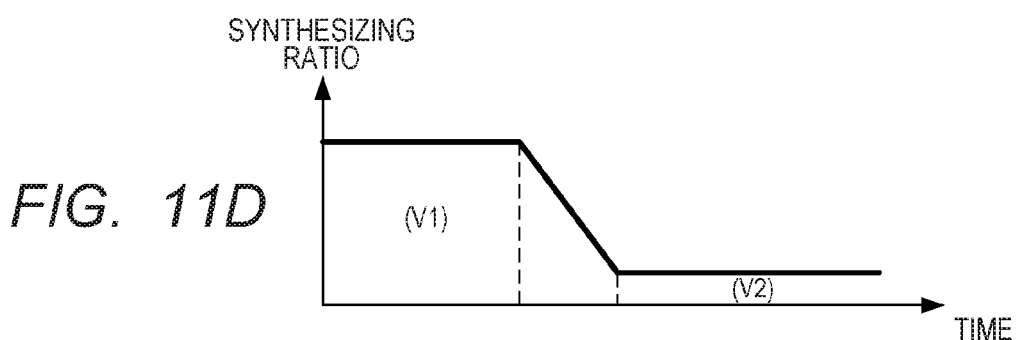

FIG. 11A is a diagram illustrating time positions of the imaging N frame, the imaging N+1 frame, and each interpolation frame generated between those imaging frames. A solid line at a left edge in FIG. 11A indicates the time position of the imaging N frame, a solid line at a right edge indicates the time position of the imaging N+1 frame, and each broken line indicates the time position of each interpolation frame, respectively. In FIGS. 11B to 11D, an axis of abscissa corresponds to the time shown by an axis of abscissa in FIG. 11A and an axis of ordinates indicates the synthesizing ratio.

FIG. 11B is a diagram illustrating the synthesizing ratio of the imaging frame image and each interpolation frame image in the case where the reliabilities of the motion vectors in the forward direction and the reverse direction are high. When the reliabilities of the motion vectors in the forward direction and the reverse direction are high, it is considered that the collapsing of each interpolation frame image is small (degree of collapsing is low). Therefore, when the values of the reliabilities of the motion vectors in the forward direction and the reverse direction are equal to or larger than a predetermined first threshold value, the synthesizing ratio calculating unit 204 sets the synthesizing ratios to all images to the same predetermined ratio by the synthesizing ratio calculating characteristics illustrated in FIG. 11B. That is, if the synthesizing ratios to all of the frame images are set to the same predetermined ratio, the interpolation frame images generated at the time positions of the equal interval can be synthesized at the predetermined synthesizing ratio in a non-exposure time between the imaging N frame and the imaging N+1 frame. In this case, a frame image with motion blur is generated as if it was photographed in the same exposure time as the time interval between the imaging N frame and the imaging N+1 frame. The synthesizing ratio calculating characteristics illustrated in FIG. 11B may be preliminarily prepared or may be generated by the synthesizing ratio calculating unit 204.

FIG. 11C is a diagram illustrating the synthesizing ratio of the imaging frame image and each interpolation frame image when the reliabilities of the motion vectors in the forward direction and the reverse direction are low. When the reliabilities of the motion vectors in the forward direction and the reverse direction are low, it is considered that the large collapsing of each interpolation frame image occurs (degree of collapsing is high). It is considered that the degree of collapsing of the interpolation frame image is larger in the interpolation frame image in which the time spans from both imaging frames of the imaging N frame and the imaging N+1 frame are large and the collapsing of the interpolation frame image is conspicuous. Therefore, when the reliabilities of the motion vectors in the forward direction and the reverse direction are lower than the predetermined first threshold value, the synthesizing ratio calculating unit 204 reduces the synthesizing ratio of the interpolation frame image in which the time spans from both imaging frames of the imaging N frame and the imaging N+1 frame are large. Specifically speaking, the synthesizing ratio calculating unit 204 reduces the synthesizing ratio to the interpolation frame images existing near the intermediate time span between the imaging N frame and the imaging N+1 frame by the synthesizing ratio calculating characteristics illustrated in FIG. 11C. In the case of the synthesizing ratio calculating characteristics illustrated in FIG. 11C, the synthesizing ratio to the interpolation frames within a range V2 where the time span from the imaging N frame or the imaging N+1 frame is larger than the predetermined first span is set to a low ratio. On the other hand, the synthesizing ratio to the interpolation frames within a range V1 where the time span from the imaging N frame or the imaging N+1 frame is equal to or less than a predetermined second span (second span<first span) is set to a high ratio. The synthesizing ratio to the interpolation frame images within a range where the time span from the imaging N frame or the imaging N+1 frame lies within a range between the first span and the second span is set to a ratio corresponding to such time spans. By reducing the synthesizing ratio to the interpolation frame images within the range V2 where the time span from the imaging N frame or the imaging N+1 frame is larger than the predetermined first span as mentioned above, the synthesization at the synthesizing ratio in which importance is attached to the interpolation frame image whose collapsing is small can be performed. Thus, the frame image with motion blur in which a residual amount of collapsing is small can be generated. The synthesizing ratio calculating characteristics illustrated in FIG. 11C may be preliminarily prepared or may be generated by the synthesizing ratio calculating unit 204.

FIG. 11D is a diagram illustrating the synthesizing ratio of the imaging frame image and each interpolation frame image when the reliability of the motion vector in the forward direction is high and the reliability of the motion vector in the reverse direction is low. In this case, it is considered that a degree of collapsing of the intermediate interpolation frame image generated from the imaging N frame image is low and a degree of collapsing of the intermediate interpolation frame image generated from the imaging N+1 frame image is high. It is considered that as described in step S705 in FIG. 7, since the intermediate interpolation frame image is generated by synthesizing the intermediate interpolation frame images in the forward direction and the reverse direction in accordance with the time positions, the degree of collapsing of the interpolation frame image at a position closer to the imaging N+1 frame is higher. Therefore, the synthesizing ratio calculating unit 204 reduces the synthesizing ratio to the interpolation frame image in which the time span from the imaging N frame is large and the time span from the imaging N+1 frame is small. Specifically speaking, the synthesizing ratio calculating unit 204 increases the synthesizing ratio to the interpolation frame image existing within the range V1 in which the time span from the imaging N frame is equal to or less than the first span by the synthesizing ratio calculating characteristics illustrated in FIG. 11D. On the other hand, the synthesizing ratio calculating unit 204 decreases the synthesizing ratio to the interpolation frame image existing within the range V2 in which the time span from the imaging N frame is larger than the predetermined second span (second span<first span). The synthesizing ratio to the interpolation frame images within a range where the time span from the imaging N frame lies within a range between the first span and the second span is set to a ratio corresponding to such time spans. By reducing the synthesizing ratio to the interpolation frame images in which the time span from the imaging N frame is large (the time span from the imaging N+1 frame is small) as mentioned above, the synthesization at the synthesizing ratio in which importance is attached to the interpolation frame image whose collapsing is small can be performed. Thus, the frame image with motion blur in which a residual amount of collapsing is small can be generated. The synthesizing ratio calculating characteristics illustrated in FIG. 11D may be preliminarily prepared or may be generated by the synthesizing ratio calculating unit 204.

For example, even when both of the reliabilities of the motion vectors in the forward direction and the reverse direction are low, a synthesizing ratio as shown in FIG. 11D may be calculated.

When the synthesizing ratio of the interpolation frame images existing near the intermediate time span as illustrated in FIG. 11C is reduced, there is a possibility that the frame image with motion blur becomes a multiple image. If such a moving image is displayed, the multiple image becomes inconspicuous. However, in order to suppress the occurrence of the multiple image, only the synthesizing ratio of the interpolation frame images closer to the imaging N frame may be increased and they may be synthesized as illustrated in FIG. 11D.

A description is returned to the flowchart of FIG. 3. After step S306, the controlling unit 101 advances the processing to step S307. The processing of step S307 is executed by the image synthesizing unit 205 under control of the controlling unit 101.

In step S307 in FIG. 3, the image synthesizing unit 205 synthesizes the imaging frame image and each interpolation frame image and generates and outputs a frame image with motion blur. For example, the image synthesizing unit 205 synthesizes the imaging N frame image and each interpolation frame image on the basis of the synthesizing ratio calculated in step S306 and generates and outputs a frame image with motion blur. That is, the moving image with motion blur consisting of a plurality of generated frame images with motion blur becomes a moving image of the same frame rate as the rate of the imaging frames captured by the imaging unit 105. According to the embodiment, since the synthesization at the low synthesizing ratio of the interpolation frame images in which a possibility that the degree of collapsing is large is high is executed, the collapsing is difficult to remain in the frame image with motion blur and a deterioration in picture quality can be prevented.

For example, when a value of the reliability of the motion vector is smaller than the second threshold value smaller than the foregoing predetermined first threshold value, it is not always necessary to use the method whereby the imaging frame image and each interpolation frame image are synthesized and the motion blur is added. For example, the motion blur may be added by executing a one-dimensional spatial filtering processing to the imaging N frame on the basis of the motion vectors in the forward direction and the reverse direction. In this case, the number of taps of a one-dimensional spatial filter is set to a length of motion vector and the direction of the one-dimensional spatial filter is set to a direction of the motion vector.

Although the example in which the reliability of the motion vector is set to the value obtained by averaging in the whole frame has been described in the embodiment, the reliability of the motion vector is not limited to such a value.

For example, the reliability of the motion vector may be calculated every pixel of the interpolation frame. In this case, the reliability shown by the correction motion vector described in step S703 in FIG. 7 is set to the reliability of the motion vector of every pixel of the interpolation frame image. The imaging N frame image and the interpolation frame image are synthesized on the basis of the synthesizing ratio calculated by applying the synthesizing ratio calculating method described in step S306 in FIG. 3 every pixel, and the frame image with motion blur is generated.

If the synthesizing ratio to generate the frame image with motion blur is largely changed every frame image with motion blur, a degree of motion blur changes every frame. Therefore, when such an image is monitored as a moving image, it becomes unnatural. In this case, the synthesizing ratio calculating unit 204 may be controlled so as to calculate the synthesizing ratio in such a manner that a difference between the synthesizing ratio of the past frame image which is precedent with respect to the time and the present frame image is equal to or less than a predetermined value.

Although the frame image with motion blur is generated by synthesizing the imaging frame image and each interpolation frame image in the foregoing description, another case where the frame image with motion blur is generated from at least one of the imaging frame image and each interpolation frame image is also incorporated in the embodiment. For instance, if the synthesizing ratio of the interpolation frame image is equal to, for example, "0" as a result of the calculation of the synthesizing ratio mentioned above, the imaging frame image becomes the frame image with motion blur. Since there can be a case where the synthesizing ratio of the interpolation frame image is set to "0", in such a case, the interpolation frame image becomes the frame image with motion blur.

As described above, in the imaging apparatus 100 of the embodiment, by adding the motion blur to the moving image in which the exposure time of each imaging frame is short, the moving image whose the motion is smooth can be generated.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-197123, filed Oct. 5, 2016, which is hereby incorporated by reference herein in its entirety.

What is claimed is:

1. An image processing apparatus comprising:
one or more processors; and
a memory storing instructions which, when the instructions are executed by the processor, cause the image processing apparatus to function as:
a calculating unit configured to calculate a motion vector between frame images of a moving image;
an interpolating unit configured to generate a plurality of interpolation frame images corresponding to a time position between frame images which are adjacent with respect to time on the basis of the motion vector; and
a generating unit configured to generate a frame image with motion blur acquired by adding a motion blur by synthesizing the frame image and the plurality of interpolation frame images, wherein
the generating unit determines a synthesizing ratio of synthesizing the frame image with one of the plurality of interpolation frame images, based on, a time span indicating difference between the time position of the frame image and the time position of one of the plurality of interpolation frame images, and
the generating unit acquires a reliability of the motion vector and time spans between the frame images and the interpolation frame image which are precedent and subsequent with respect to time, and determines the synthesizing ratio on the basis of the reliability of the motion vector and the time spans.

2. An apparatus according to claim 1, wherein the generating unit generates the frame image with blur of a same frame rate as a frame rate at the time when the moving image is photographed.

3. An apparatus according to claim 1, wherein when the reliability of the motion vector is smaller than a first threshold value, the generating unit sets the synthesizing ratio to the interpolation frame image at a time position where the time spans from both of the frame image which is precedent with respect to the time and the frame mage which is subsequent with respect to the ti e re larger than a predetermined span to a value smaller than the synthesizing ratio to the interpolation frame image at a time position where the time spans are equal to or smaller than the predetermined span.

4. An apparatus according to claim 1, wherein when the reliability of the motion vector is smaller than a first threshold value, the generating unit sets the synthesizing ratio to the interpolation frame image at a time position where the time span from the frame image which is precedent with respect to the time is larger than a predetermined span to a value smaller than the synthesizing ratio to the interpolation frame image at a time position where the time span is equal to or smaller than the predetermined span.

5. An apparatus according to claim 1, wherein when the reliability of the motion vector is equal to or larger than a first threshold value, the generating unit sets the synthesizing ratios to all images to a same predetermined ratio.

6. An apparatus according to claim 3, wherein the generating unit calculates the synthesizing ratio in such a manner that a difference between the synthesizing ratio of the present frame and the synthesizing ratio of the frame which is precedent to the present frame with respect to the time is equal to or less than a predetermined value.

7. An apparatus according to claim 1, wherein the generating unit calculates the reliability of the motion vector on the basis of at least one of a plurality of correlation values among the frame images and variations of a plurality of motion vectors in a neighboring region of a target pixel.

8. An apparatus according to claim 1, wherein the generating unit adjusts the reliability of the motion vector in the whole frame image on the basis of a minimum value among the reliabilities of a plurality of motion vectors in the whole frame image.

9. An apparatus according to claim 1, wherein the generating unit excludes the motion vector in which the reliability of the motion vector satisfies a predetermined condition among a plurality of motion vectors.

10. An apparatus according to claim 3, wherein when the reliability of the mot on sector is smaller than a second threshold value smaller than the first threshold value, the generating unit generates the frame image with blur by executing a spatial filtering processing to the frame image on the basis of the motion vector.

11. An apparatus according to claim 1, wherein the frame image is an image photographed in an exposure time shorter than a time interval between the frame images.

12. An image processing method of an image processing apparatus, comprising the steps of:
calculating a motion vector between frame images of a moving image;
generating a plurality of interpolation frame images corresponding to a time position between frame images which are adjacent with respect to time on the basis of the moving image; and
generating a frame image with motion blur acquired by adding a motion blur, by synthesizing the frame image and the plurality of interpolation frame images, wherein
the generating step determines a synthesizing ratio of synthesizing the frame image with one of the plurality of interpolation frame images, based on a time span indicating difference between the time position of the frame image and the time position of one of the plurality of interpolation frame images, and
the generating step acquires a reliability of the motion vector and time spans between the frame images and the interpolation frame image which are precedent and subsequent with respect to time, and determines the synthesizing ratio on the basis of the reliability of the motion vector and the time spans.

13. A non-transitory computer-readable recording medium storing a readable controlling program for operating a computer as:
a calculating unit configured to calculate a motion vector between frame images of a moving image;
an interpolating unit configured to generate a plurality of interpolation frame images corresponding to a time position between frame images which are adjacent with respect to time on the basis of the motion vector; and
a generating unit configured to generate a frame image with motion blur acquired by adding a motion blur, by synthesizing the frame image and the plurality of interpolation frame images, wherein the generating unit determines a synthesizing ratio of synthesizing the frame image with one of the plurality of interpolation frame images, based on a time span indicating difference between the time position of the frame image and the time position of one of the plurality of interpolation frame images, and the generating unit acquires a reliability of the motion vector and time spans between the frame images and the interpolation frame image which are precedent and subsequent with respect to time, and determines the synthesizing ratio on the basis of the reliability of the motion vector and the time spans.

* * * * *